(12) United States Patent
Brade (10) Patent No.: US 11,773,553 B2
(45) Date of Patent: Oct. 3, 2023

(54) SECTIONAL REINFORCED CONCRETE SEAWALL

(71) Applicant: Donald E. Brade, Kinde, MI (US)

(72) Inventor: Donald E. Brade, Kinde, MI (US)

(*) Notice: Subject to any disclaimer, the term of this patent is extended or adjusted under 35 U.S.C. 154(b) by 0 days.

(21) Appl. No.: 17/443,664

(22) Filed: Jul. 27, 2021

(65) Prior Publication Data

US 2022/0025597 A1 Jan. 27, 2022

Related U.S. Application Data

(60) Provisional application No. 63/057,198, filed on Jul. 27, 2020.

(51) Int. Cl.
*E02B 3/06* (2006.01)
*B28B 23/02* (2006.01)

(52) U.S. Cl.
CPC .............. *E02B 3/06* (2013.01); *B28B 23/024* (2013.01)

(58) Field of Classification Search
CPC ........... E02B 3/06; E02B 3/04; B28B 23/024; Y02A 10/11; Y02A 10/26
See application file for complete search history.

(56) References Cited

U.S. PATENT DOCUMENTS

| | | | | |
|---|---|---|---|---|
| 1,993,291 A | * | 3/1935 | Vermont | E02D 23/02 405/286 |
| 4,498,805 A | * | 2/1985 | Weir | E02B 3/06 405/35 |
| 4,776,725 A | | 10/1988 | Brade | |
| 5,746,036 A | * | 5/1998 | Angelette | E02D 27/42 52/294 |
| 6,669,403 B2 | | 12/2003 | Clark et al. | |
| 7,588,390 B2 | | 9/2009 | Kelley | |
| 9,903,080 B2 | | 2/2018 | Minton | |
| 10,400,407 B2 | | 9/2019 | Minton | |
| 2004/0244667 A1 | * | 12/2004 | Veazey | B63B 3/04 114/258 |
| 2008/0138155 A1 | * | 6/2008 | Kelley | E02B 3/06 405/21 |

* cited by examiner

*Primary Examiner* — Carib A Oquendo
(74) *Attorney, Agent, or Firm* — Brooks Kushman P.C.

(57) ABSTRACT

A seawall section includes a central hub having an axis extending in a longitudinal direction and three circumferentially spaced walls extending radially from the central hub. Each of the walls is made of cast concrete reinforced with a rebar cage having a plurality of longitudinally spaced pairs of parallel rebars extending radially from the central hub to an end rebar that extends perpendicularly relative to the parallel rebars. Each end rebar is connected to radially outer ends of one of the pairs of parallel rebars. A seawall comprises a plurality of the seawall sections connected together end-to-end with a cable, and connecting plates fastened to adjacent sections. A form for manufacturing the seawall section encloses connected rebars and is filled with concrete.

12 Claims, 10 Drawing Sheets

SECTIONAL REINFORCED CONCRETE SEAWALL

REFERENCE TO RELATED APPLICATIONS

This application claims the benefit of U.S. provisional application Ser. No. 63/057,198 filed Jul. 27, 2020, the disclosure of which is hereby incorporated in its entirety by reference herein.

TECHNICAL FIELD

This disclosure relates to a reinforced concrete seawall made in sections with three circumferentially spaced wall sections radially outwardly extending from a hub.

BACKGROUND

Seawalls are used to control erosion of the land adjacent bodies of water by breaking up waves that would otherwise wash away soil and infrastructure. A sectional seawall is disclosed in applicant's prior U.S. Pat. No. 4,776,725. This application is directed to improvements in sectional seawalls.

Seawalls must be durable to withstand the wave action for an extended period of time. Seawalls must also prevent leakage between the sections that can erode soil behind the seawall and weaken the seawall.

Forms are constructed to form the seawall sections by assembling rebar inside the form before pouring concrete into the forms. After curing the concrete, the forms are disassembled and cleaned for reuse. The heavy seawall sections are difficult to move and the forms must remain in place until the cast section is substantially cured. The forms are generally assembled with conventional concrete form walls and fasteners in a time-consuming assembly process.

The method of making the seawall sections disclosed in my prior patent included joining a plurality of V-shaped reinforcing bars that are welded together with longitudinally extending reinforcing bars. The V-shaped bars include a longer leg and a shorter leg. The shorter leg is joined at the terminal end of the shorter leg to an intermediate location on the longer leg. The terminal end of the longer bar is fixed to a longitudinally extending reinforcing bar. The V-shaped reinforcing bars are also welded to longitudinally extending bars within the hub and are also welded at a mid-portion of the legs. While the prior method produced an effective seawall, a more efficient method of producing a more durable seawall is desired.

This disclosure is directed to solving the above problems and other problems as summarized below.

SUMMARY

According to one aspect of this disclosure a seawall section is disclosed that includes a central hub having an axis extending in a longitudinal direction and three circumferentially spaced walls extending radially from the central hub. Each of the walls is made of cast concrete reinforced with a rebar cage having a plurality of longitudinally spaced pairs of parallel rebars extending radially from the central hub to an end rebar that extends perpendicularly relative to the parallel rebars. Each end rebar is connected to radially outer ends of one of the pairs of parallel rebars.

According to other aspects of this disclosure, the rebar cage may include longitudinally extending rebars connected to the end rebars. The end rebars are connected at the outer ends of the parallel rebars. The end rebars are welded to the longitudinally extending rebars.

The rebar cage may include intermediate rebars connected to the parallel rebars between and spaced from the central hub and the end rebars. The parallel rebars may be connected to each other within the central hub by a hub rebar web encircling the axis of the central hub.

The circumferentially spaced walls may define a plurality of spaced holes through the cast concrete for receiving fasteners. At least one of the holes in each wall extends parallel to one of the end rebars and is disposed radially inside the end rebars.

At least three of the spaced pairs of the parallel rebars are longitudinally spaced from each other to reinforce the cast concrete at longitudinally spaced locations.

A pipe may be aligned with the axis and disposed within a central opening defined by the hub and extending in a longitudinal direction.

According to another aspect of this disclosure, a seawall is disclosed that comprises a plurality of seawall sections that each include a central hub having an axis extending in a longitudinal direction, and three circumferentially spaced walls extending radially from the central hub. Each of the walls is made of cast concrete reinforced with a rebar cage having a plurality of longitudinally spaced pairs of parallel rebars extending radially from the central hub to an end rebar that extends perpendicularly relative to the parallel rebars. The end rebars are connected to the outer ends of one of the pairs of parallel rebars. A pipe is aligned with the axis and disposed within a central opening defined by the hub that extends in a longitudinal direction. The walls define a plurality of spaced holes through the cast concrete for receiving fasteners. At least one of the holes in each wall is disposed radially inside the end rebars. A plurality of elongated plates are attached on opposite ends to two adjacent seawall sections with fasteners that are received in the holes. A cable is inserted through the pipes of each of the adjacent seawall sections that hold the seawall sections together.

A gasket formed of an elastic material may be provided between adjacent seawall sections to prevent leakage between the adjacent sections. The gasket includes a hub section and wall joining sections to form a seal between adjacent seawall section walls.

According to another aspect of this disclosure, a form for manufacturing a seawall section is disclosed. The form includes a base including a planar plate that defines a plurality of holes. A plurality of V-shaped walls are attached at a lower end of the walls to the base with the walls being joined together to define a hub-forming space. A plurality of end walls are each secured to the radially outer ends of two adjacent V-shaped walls with a plurality of releasable fasteners. A top plate is attached to a top end of the V-shaped walls. A first tube locating protrusion is provided on the base and a second tube locating protrusion is provided on a lower surface of the top plate. First and second tube locating protrusions are adapted to retain a pipe inside the hub forming space. A plurality of spacers is assembled between adjacent V-shaped walls in alignment with two openings defined by the adjacent V-shaped sidewalls. A plurality of fasteners each secure two of the V-shaped walls to one of the spacers.

According to other aspects of the form for manufacturing the seawall section, the base may further comprise a set of channels provided on the lower surface of the base that are adapted to receive forklift tines. The base may define access openings proximate each of the plurality of holes for providing access to the lower side of the base for fastening and unfastening the V-shaped walls to the base. The spacers may be tapered from a first end to a second end of the spacers to facilitate removing the spacers from the seawall section.

The releasable fasteners may include pivotable bolts that extend between the end walls and the V-shaped walls, wherein a nut assembled to each of the pivotable bolts secures the V-shaped walls to the end walls. The form may further comprise a rebar cage received within the V-shaped walls. The rebar cage may include a plurality of longitudinally spaced pairs of parallel rebars with each pair extending radially from the central hub to an end rebar that extends perpendicularly relative to the parallel rebars. The end rebars may be connected to radially outer ends of one of the pairs of parallel rebars.

Another aspect of this disclosure relates to a method of making a seawall section. The method comprises the steps of assembling a rebar cage and welding the rebar cage together. The rebar cage has a plurality of longitudinally spaced pairs of parallel rebars each pair extending radially from a central hub to an end rebar that extends perpendicularly relative to the parallel rebars. The end rebars are connected to radially outer ends of one of the pairs of parallel rebars. Placing the rebar cage on a base. Attaching a plurality of V-shaped walls to the base around the rebar cage. The V-shaped walls define spacer attachment openings. Inserting spacers between two adjacent V-shaped walls in alignment with the spacer attachment openings. Securing the spacers with fasteners to hold the V-shaped walls together. Assembling an end wall to two adjacent V-shaped walls and filling a casting space defined by the V-shaped walls, the end plates, and the spacers with a concrete mixture.

According to other aspects of the method of making a seawall section, the method may further comprise securing a pipe within the central hub to a first protrusion attached to the base and a second projection attached to a top plate.

The step of attaching the V-shaped walls may further comprise attaching one of the V-shaped walls to the base before placing the rebar cage on the base and attaching the other V-shaped walls to the base to enclose the rebar cage.

The step of inserting spacers between adjacent V-shaped walls may further comprise holding the spacers with an elongated member having at least one magnet at one end that magnetically retains one of the spacers between the V-shaped walls and in alignment with the spacer attachment openings.

The method of making a seawall section may further comprise curing the concrete mixture to form the seawall section, disassembling the V-shaped walls from the seawall section and the base, and removing the spacers from the seawall section.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
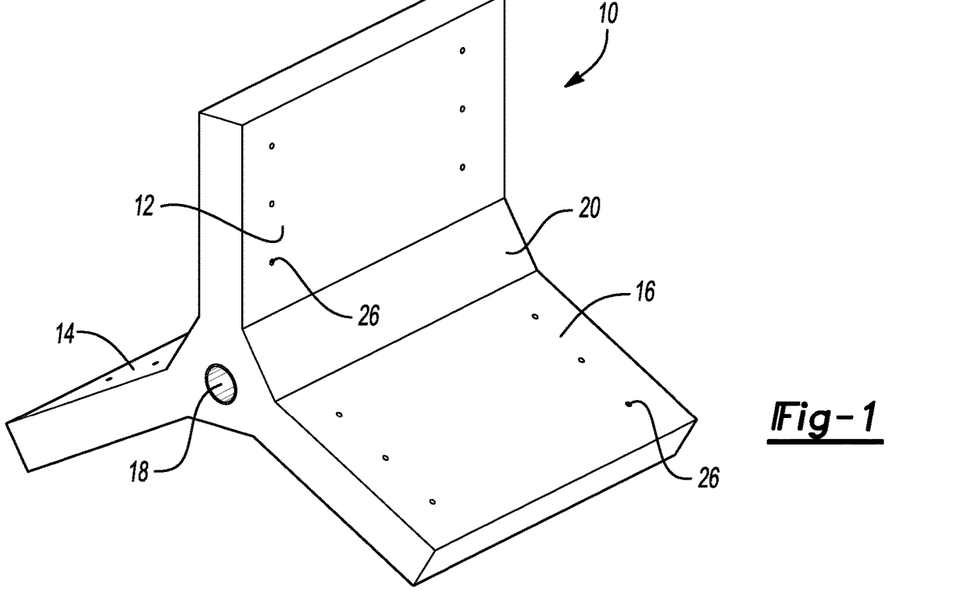
FIG. 1 is a perspective view of a seawall section made according to one embodiment of this disclosure.
Figure 2:
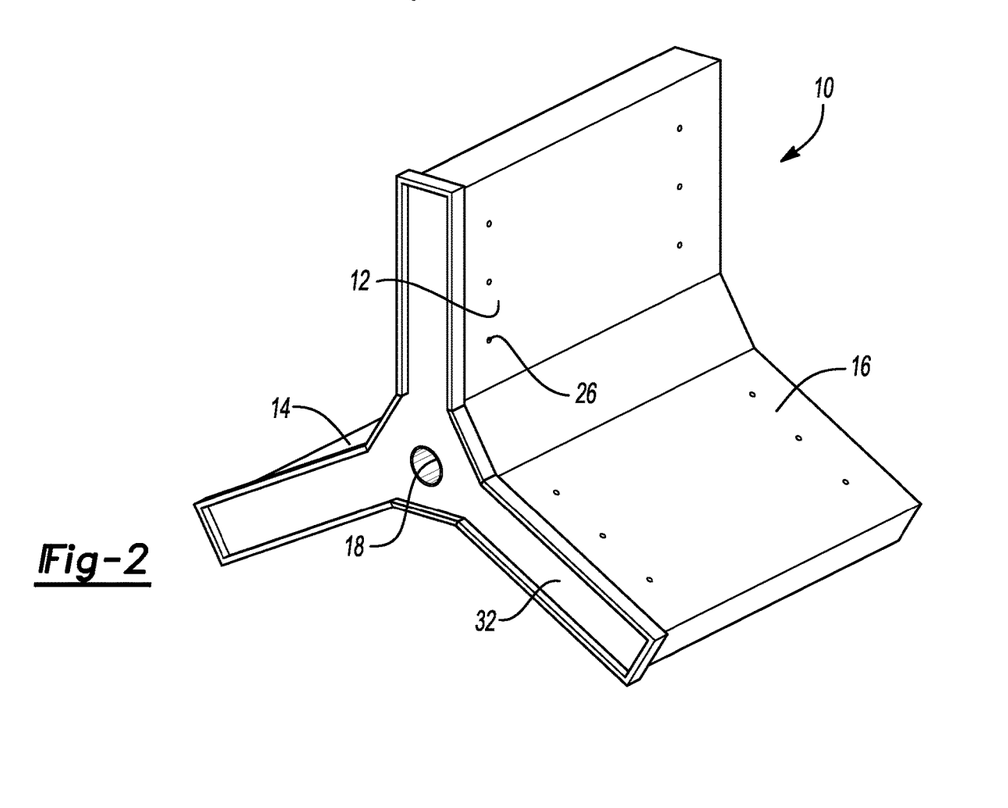
FIG. 2 is a perspective view of a seawall section including a gasket on one end made according to one embodiment of this disclosure.

Referring to FIGS. 1 and 2, a seawall section 10 is illustrated that includes a top wall 12, a lower rear wall 14, and a lower front wall 16. A pipe 18 is embedded in and extends longitudinally through a central hub 20. The pipe 18 is adapted to receive a cable 22 (shown in FIG. 3) that is used to secure a plurality of seawall section 10 together, A plurality of holes 26 are formed in each of the walls 12, 14, and 16 that are adapted to receive a fastener 28 (shown in FIGS. 6 and 7) that is adapted to secure attachment plates 30. (also shown in FIGS. 6 and 7) A gasket 32 is shown attached to one end of the seawall section 10 that is provided to seal between two adjacent seawall sections 10.

Figure 3:
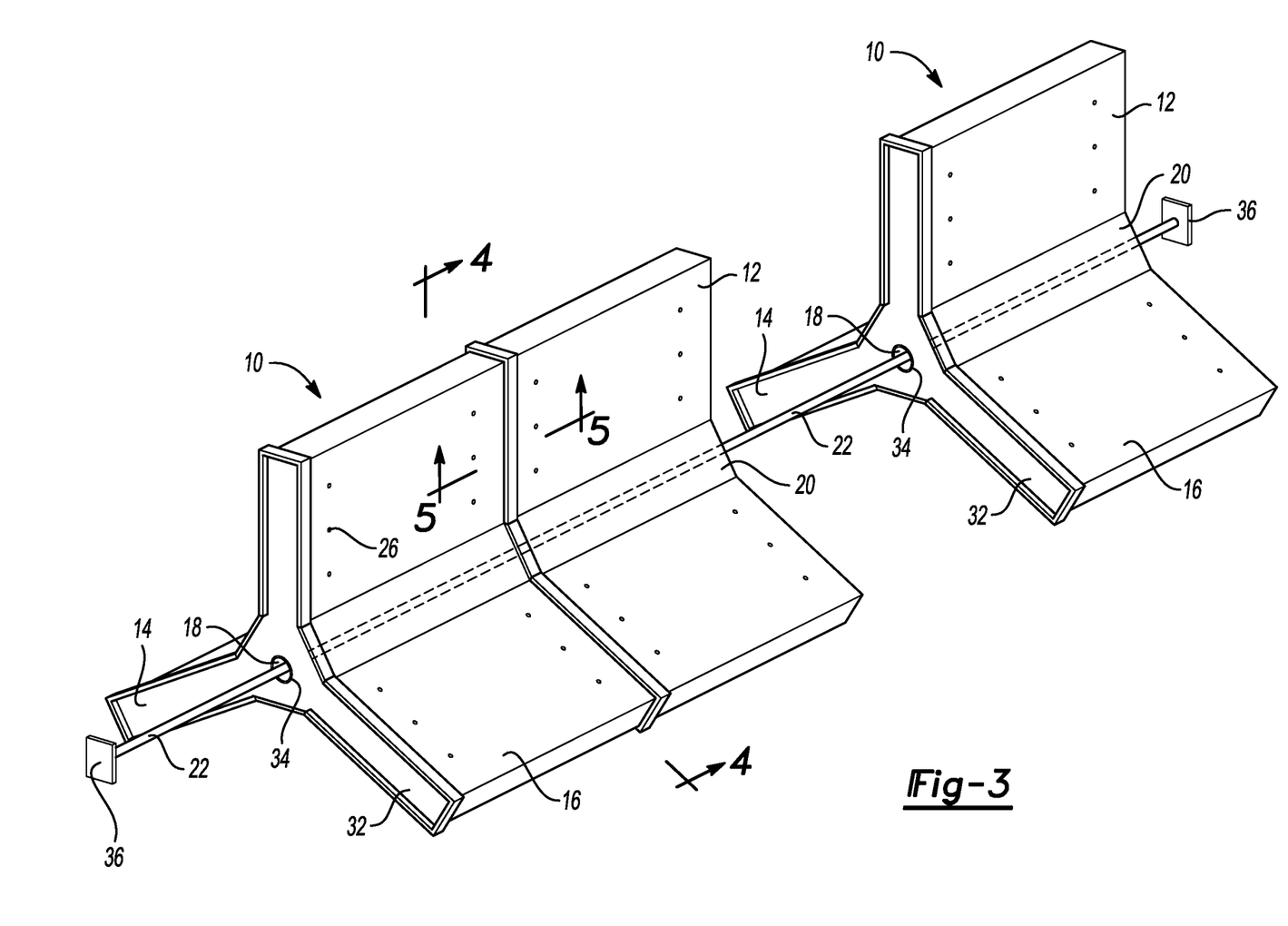
FIG. 3 is a perspective view of three seawall sections with one section being shown as it is assembled to two previously assembled sections with a cable being routed through the sections.

Referring to FIG. 3, three seawall sections 10 are illustrated with two seawall sections 10 being secured together with a gasket 32 between the sections 10. A third seawall section 10 with a gasket 32 attached to one end is shown in position to be assembled to the two assembled seawall sections 10. A cable 22 is routed through the pipes 18 in the seawall sections 10 and openings 34 defined by the gaskets 32. Cable end tensioners 36 are attached to the cable 22. While end plates are shown in FIG. 4, other types of cable tensioning devices could be used for tensioning and securing the ends of the cable 22 to the outermost seawall sections 10 in a group of seawall sections 10.

Figure 4:
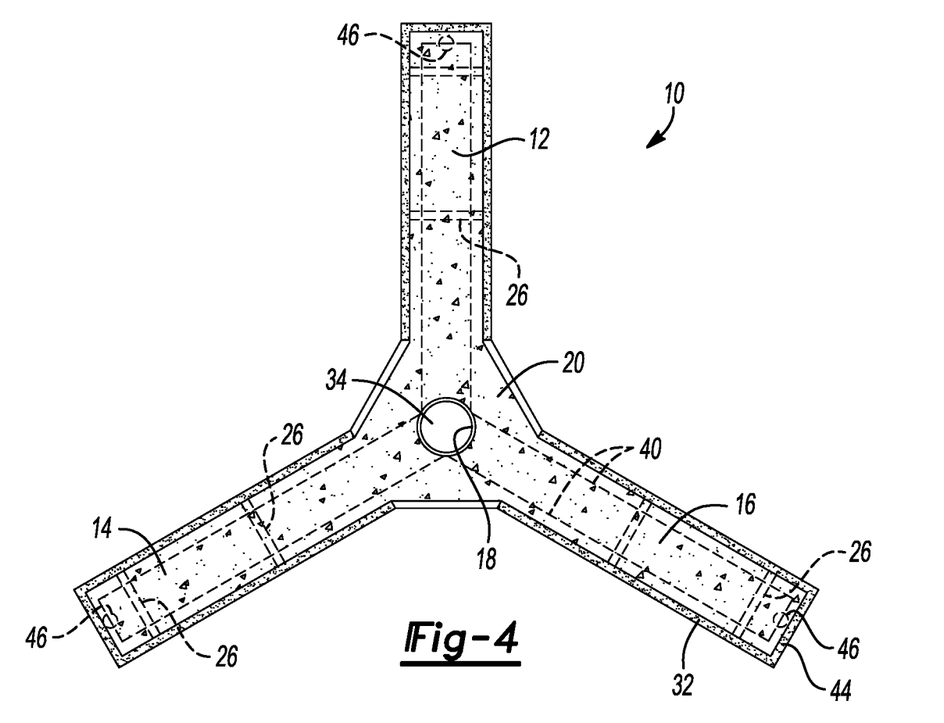
FIG. 4 is a cross-sectional view taken along the line 5-5 in FIG. 3.
Figure 5:
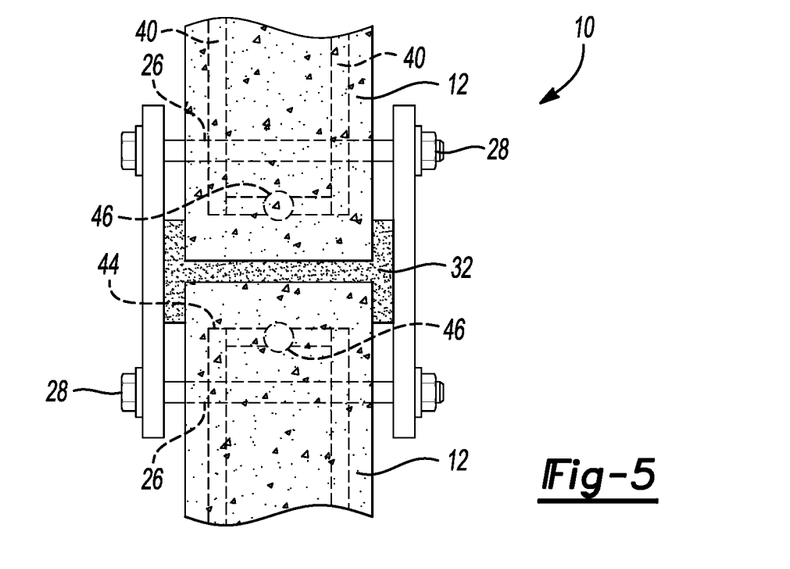
FIG. 5 is a fragmentary cross-section view taken along the line 6-6 in FIG. 3.

Referring to FIGS. 4-5, the seawall section 10 is shown in cross section. The seawall section 10 is formed of concrete reinforced by a rebar cage 38 shown in phantom lines in FIGS. 4 and 5. The rebar cage 38 includes parallel legs 40 that extend radially outwardly from the central hub 20 of the seawall section 10 in which the parallel legs are encased in concrete. The legs are recessed from the outer surface of the top wall 12, lower rear wall 14, and lower front wall 16. An end piece 42 of rebar is connected to the distal ends 44 of the parallel legs 40. The end pieces 42 may be tied to the distal ends 44 by rebar clips or ties or may be welded to the distal ends 44. The end pieces 42 extend in a generally circumferential direction and are recessed from the outer surface of the ends of the walls 12, 14, and 16.

The end piece 42 and legs 40 are structured to reinforce the ends of the walls 12, 14, and 16 are interconnected to form a U-shaped end reinforcement of the rebar cage 38. The holes 26 closest to the distal ends of the walls 12, 14, and 16 are disposed radially inside the end pieces 42. The holes 26 receive the fasteners 28 that are used to secure adjacent seawall sections 10 together with the attachment plates 30 that are secured to opposite side of the top wall 12. The fasteners 28 and attachment plates 30 are radially inboard of the end pieces 42 and distal ends 44 of the parallel legs 40 of the rebar cage 38 assure that the ends of the concrete walls 12 are reinforced against forces applied to the seawall that would tend to separate the seawall sections 10.

The end pieces 42 include a longitudinally extending (when deployed as a seawall) end rebar 46 and several end links 48 that extend perpendicular to the end rebar 46. When the rebar cage 18 is set up for casting the concrete, the end rebar 46 extends vertically through the form and the end links 48 extend in the horizontal direction. Two to five sets of parallel legs 40 may be stacked and spaced from each other in the vertical direction in the form before casting the concrete. It should be understood that the sets of parallel legs 40 are spaced horizontally when the seawall section 10 is set in place to form the seawall.

Figure 6:
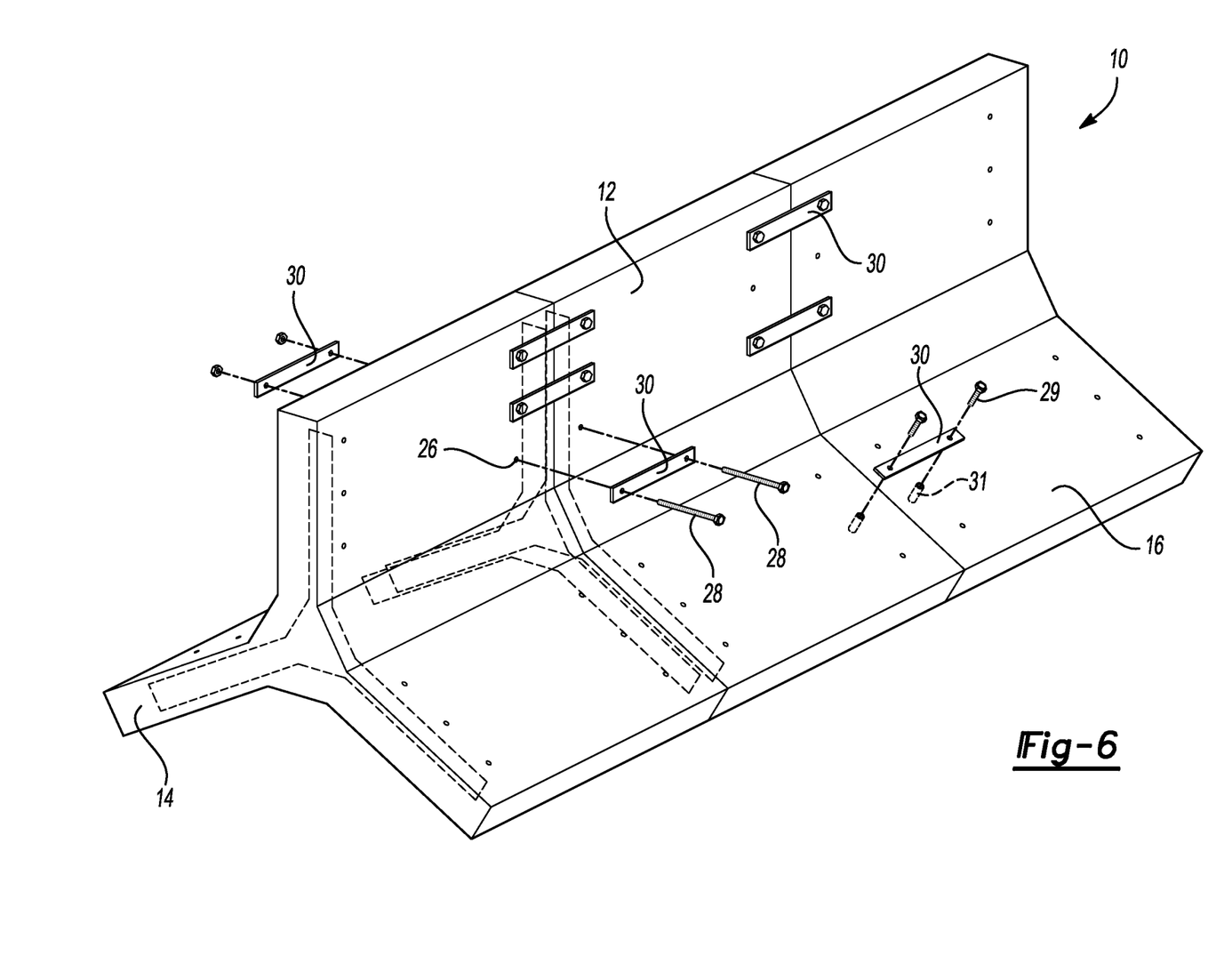
FIG. 6 is a perspective view of three seawall sections according to another embodiment of this disclosure being secured together with plates fastened to the inner and outer surfaces of the upper wall.

Referring to FIG. 6, three seawall sections 10 are secured together with two or three attachment plates 30 being secured to two adjacent seawall sections 10 with the fasteners 28. In the embodiment illustrated in FIG. 6, there is no pipe 18 or cable used to secure the seawall sections 10 together. The fasteners 28 extend through the top wall and are disposed inside the parallel legs 40 of rebar so that the rebar cage reinforces the ends of the seawall sections 10 and prevents separation of the seawall sections 10.

With continued reference to FIG. 6, the fasteners 28 used to connect the seawall sections 10 are not used to connect two lower front walls 16. Instead, a bolt 29 and an embedded receptacle or nut 31 connect the attachment plates 30 to the two adjacent sections 10. These attachment plates 30 are in addition to the attachment plates installed on the top wall 12 as described in the previous paragraph. The advantage of the bolt 29 and embedded nut 31 is that the connecting plate 30 may be attached from one side of the lower front walls 16 because the opposite side of the lower front walls is inaccessible.

Figure 7:
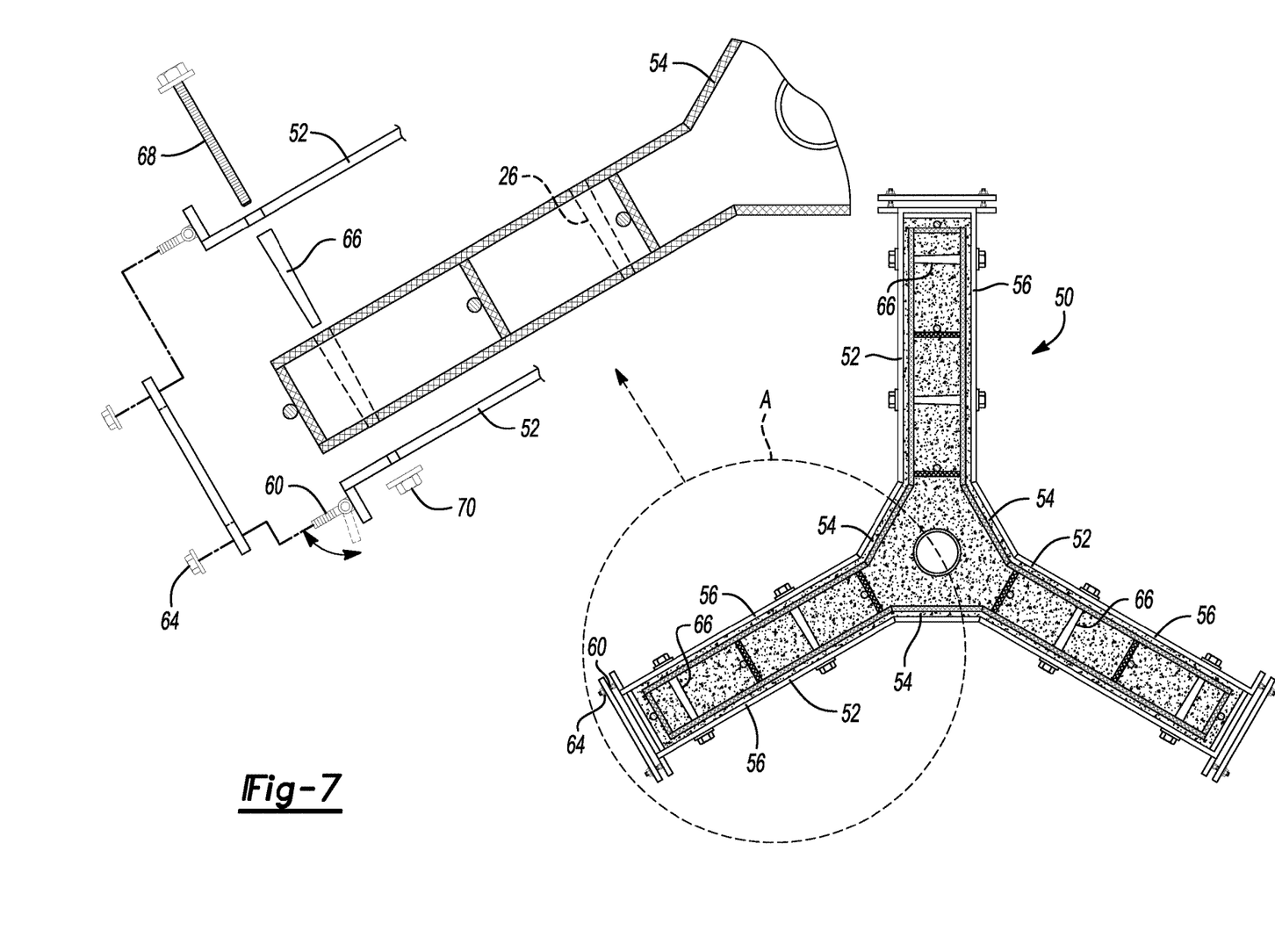
FIG. 7 is a diagrammatic view of one wall of the seawall section showing tapered spacers secured between the side walls of the form and inside the rebar cage.

Referring to FIG. 7, a top plan view of an assembled form 50 is shown with a portion used to form the top leg 12 within the circle "A" being enlarged and exploded apart to illustrate the structure of the form 50. The form includes three form side walls 52 that extend vertically when the form 50 is assembled and ready for pouring the concrete. Each form side wall 52 includes a central form wall 54 and two generally radially extending form walls 56. An end form cap 58 is attached to two adjacent form side walls 52 at the distal ends of the form side walls. The form end caps 58 are secured to pivoting toggle bolts 60 provided on the distal ends of the form side walls 52 that are received in slots 62 (shown in FIG. 8) defined by the end form cap 58. Nuts 64 attached to the pivoting toggle bolts 60 secure the form end caps 58 to the form side walls 52.

Tapered spacers 66 are assembled to the form 50 with form bolts 68 and nuts 70 to hold the form side walls 52 together while the concrete is poured and cured.

Figure 8:
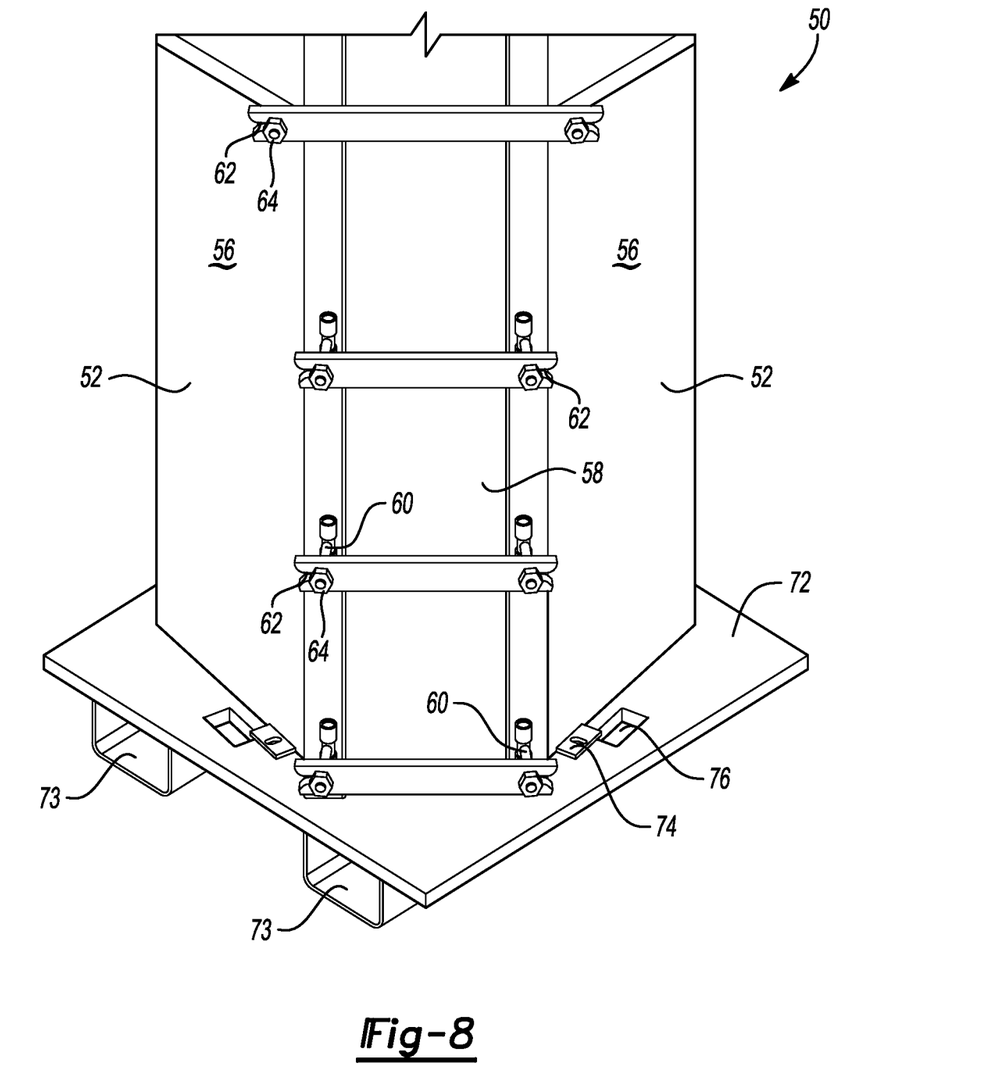
FIG. 8 is an elevation view of an end plate form shown assembled to two side walls of the form.

Referring to FIG. 8, the end form cap 58 is shown attached to two form side walls 52, and a base plate 72. The form 50 is attached to the base plate 72 with base plate flanges 74 and fasteners that may comprise a nut and bolt. An access opening 76 is defined in the base plate 72 adjacent the location where the base plate fasteners 74 are installed to permit the base plate fasteners 74 to be installed and tightened. The base plate 72 may be provided with forklift channels 73 on a bottom surface to facilitate moving the form 50 into position for pouring the concrete and for moving the form after filling and partially curing the seawall section 10. As previously described with reference to FIGS. 6 and 7, the end form cap 58 is attached to the end form cap 58 by inserting the pivoting toggle bolts 60 into the slots 62 and are secured by the nuts 64.

Figure 9:
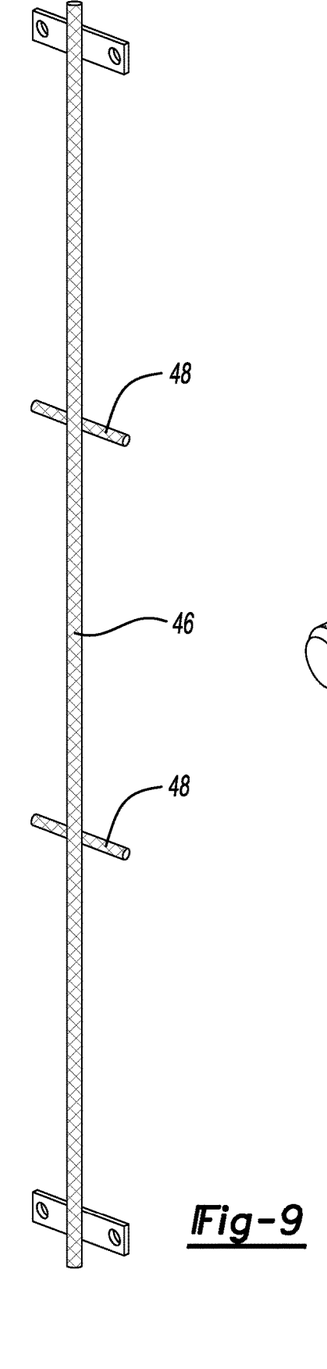
FIG. 9 is a fragmentary perspective view of the end rebar piece with two horizontally oriented rebars in position to be tied to the end rebar piece.

Referring to FIG. 9, the end rebar 46 is shown in isolation with two intermediate end links 48 form of rebar and two end link plates 78. The end rebar 46 may include various combinations of end links 48 and end link plates 78. The end links 48 and end link plates 78 may be welded or tied to the parallel legs 40 of the rebar cage 38.

Figure 10:
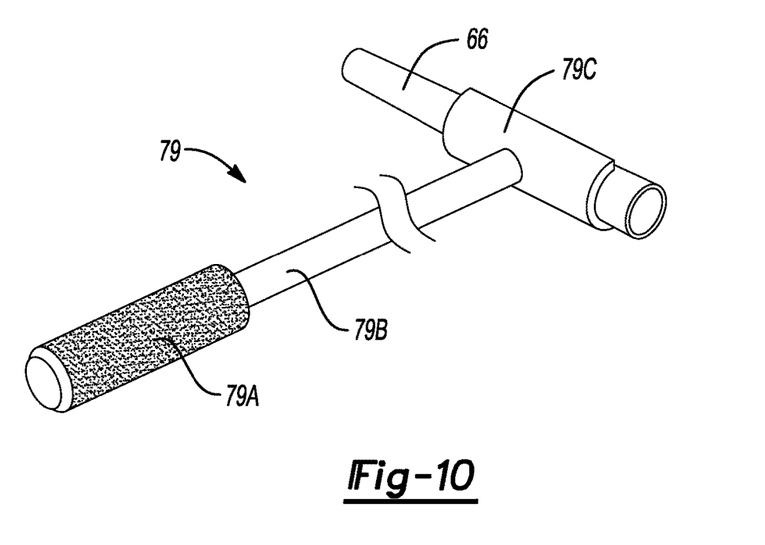
FIG. 10 is a perspective view of an end rebar piece having extensions adapted to be tied to the horizontally oriented rebars as cast.

Referring to FIGS. 7 and 10, the tapered spacers 66 are inserted between the form sidewalls 52 with a magnetic spacer holder 79 and aligned with holes 67 in the radially extending form walls 56. When aligned with the holes 67 defined by the form side walls 52, the bolts 68 are inserted in the tapered spacers 66 to hold the spacers 66 in place and the magnetic spacer holder 79 is detached. The magnetic spacer holder 79 includes a handle 79A at one end of an elongated body 79B. A magnetic holder 79C is attached to the elongated body 79B that holds the tapered spacer 66. The tapered spacers 66, form bolts 68, and nuts 70 are removed after curing the concrete and may be reused. The tapered spacers 66 are tapered to facilitate tapping the spacers out of the seawall sections 10 for reuse.

Figure 11:
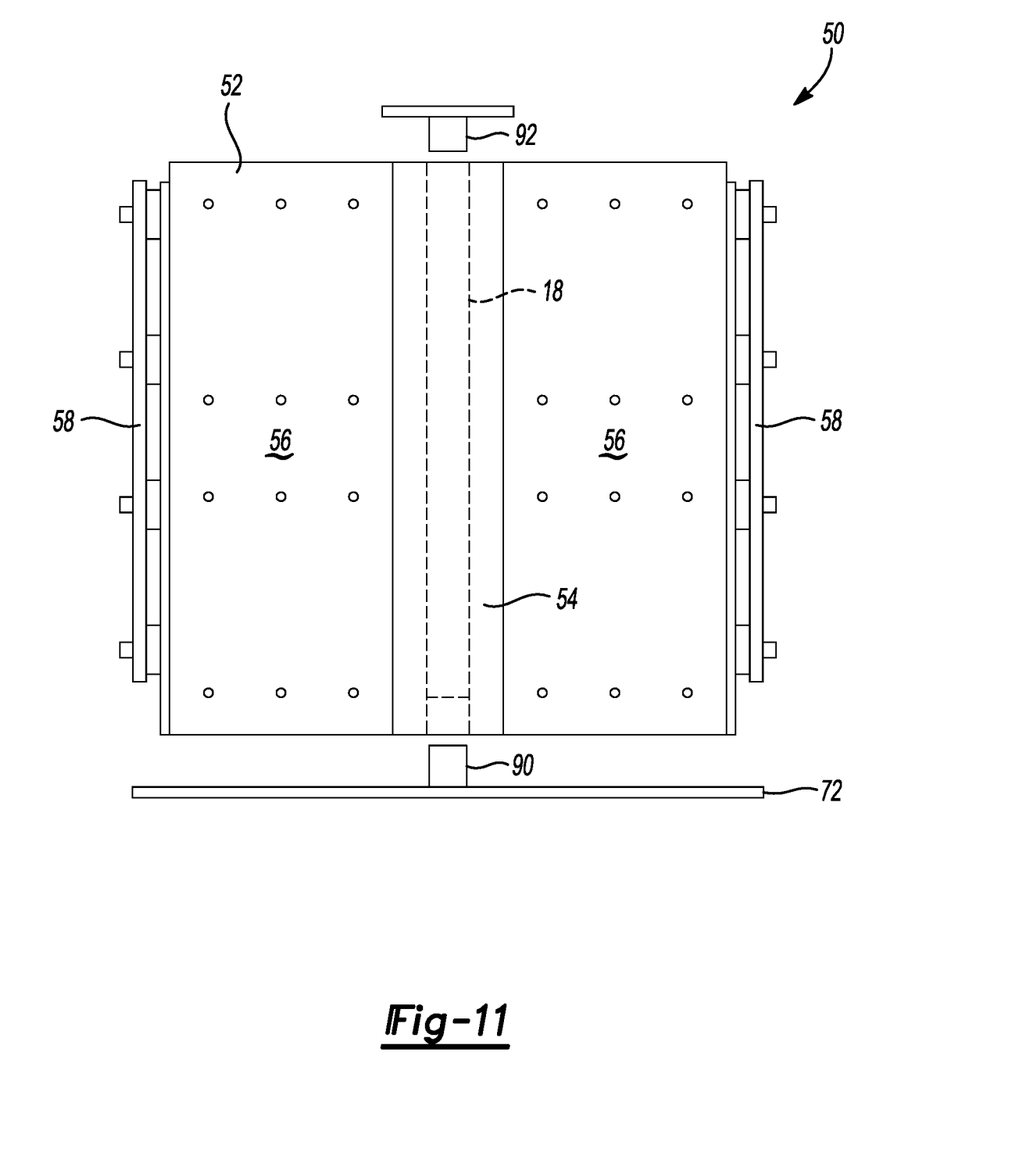
FIG. 11 is a side elevation view of the assembled form with protrusions for retaining a pipe in the central hub area of the form.

Referring to FIG. 11, an assembled form 50 is shown to include a form side wall 52 that includes two radially extending form walls 56 flanking a central form wall 54. Two end form caps 58 are attached to the radially extending form walls 56 on opposite ends of the form 50. A base tube locating protrusion 90 is provided on the base plate 72 and a top tube locating protrusion 92 is assembled to the top of the form 50. The pipe 18 is retained between the base tube locating protrusion 90 and the top tube locating protrusion 92 during the concrete casting step of forming the seawall section 10.

Figure 12:
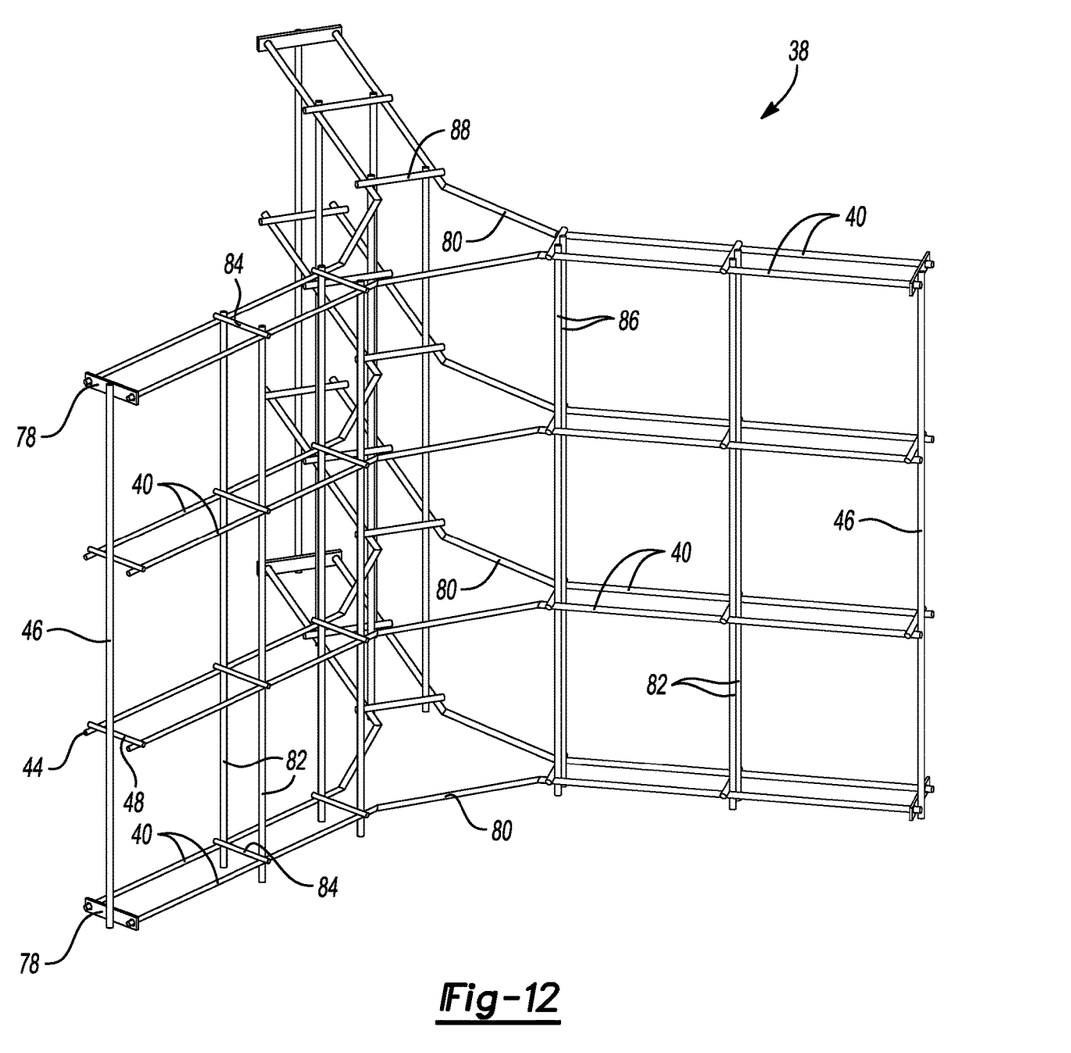
FIG. 12 is a diagrammatic perspective view of an assembled rebar cage for one embodiment of a seawall section.

Referring to FIG. 12, a fully assembled rebar cage 38 is illustrated in the desired orientation for forming the seawall section 10. The end rebars 46 are vertically oriented to hold four sets of parallel legs 40 in a spaced relationship. The parallel legs 40 are joined in the central hub 20 area by central rebars 80 that are generally arranged in a triangular array. An intermediate rebar upright 82 is attached to the parallel legs 40 by rebar links 84 to support the parallel legs 40. A central rebar upright 86 is attached at the radially inner end of the parallel legs 40 by rebar links 88.

Figures 13, 14:
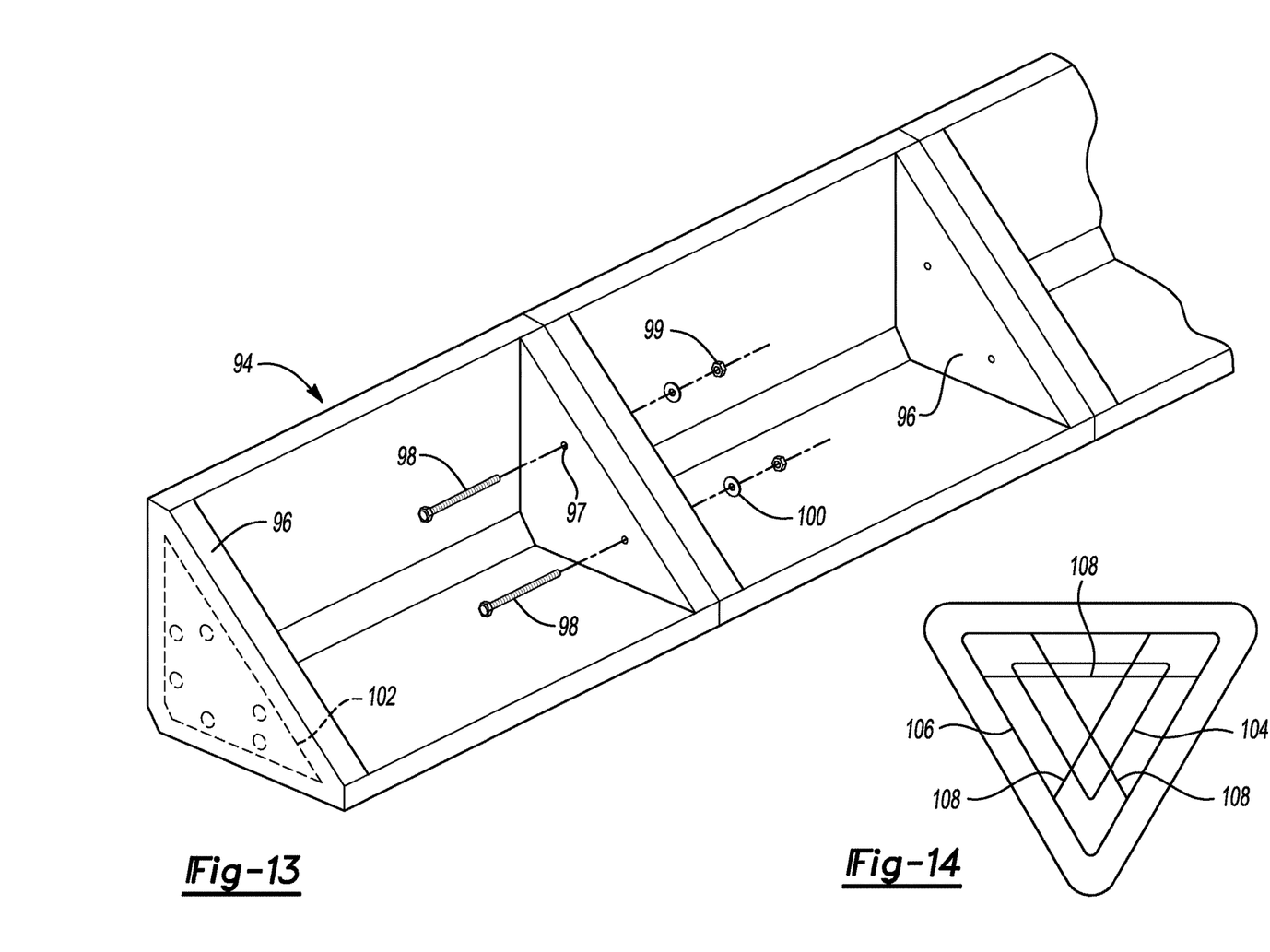
FIG. 13 is a fragmentary perspective view of several sections of a seawall assembled together with two sections in position to be connected by fasteners oriented for inserting the fasteners to connect end walls of two adjacent sections.
FIG. 14 is a schematic view of an end wall showing the location of the rebar contained within the end wall.

Referring to FIG. 13, an alternative embodiment of several seawall sections 94 is illustrated that include a pair of end walls 96 on opposite lateral ends of each section 94. Each seawall section 94 includes a top wall 12, a lower rear wall 14, and a lower front wall 16. Each seawall section 94 includes elements corresponding to the structure of the seawall sections 10 including the top wall 12, lower rear wall 14, and lower front wall 16 that extend radially outwardly from the central hub 20. The end walls 96 of two adjacent seawall sections 94 are secured together after positioning the seawall sections 94 on the ground with several bolts 97 that are inserted through holes 98 defined by the end walls 96. A nut 99 and washer 100 are then attached to the bolt 97 to lock the seawall sections 94 together. The holes 97 are formed by inserting spacers 66 into the form prior to casting the seawall sections 94 and are removed after the concrete is set. The holes 97 are located radially inboard of the rebar 102 in each end wall 96.

Referring to FIG. 14, in one example, the rebar in each end wall includes an inner triangular shaped rebar 104 and an outer triangular shaped rebar 106 that are connected by three crossing rebars 108.

One method of making a seawall section 10 is disclosed that begins with the step of assembling a rebar cage 38 and welding the rebar cage together. The rebar cage 38 has a plurality of longitudinally spaced pairs of parallel legs 40 that radially from a central hub 20 to an end rebar 46 that extends perpendicularly relative to the parallel legs 40. The end rebars 46 are connected to distal ends 44 of one of the pairs of parallel legs 40. The rebar cage 38 is then placed on the base plate 72. A plurality of V-shaped form side walls 52 are attached to the base plate 72 around the rebar cage 38. The V-shaped form side walls 52 define spacer attachment openings 26. Spacers 66 are then inserted between two adjacent V-shaped form side walls 52 in alignment with the spacer attachment openings 26. The spacers 66 are then secured with fasteners 68, 70 that hold the V-shaped form side walls 52 together as the seawall section 10 is formed. An end form cap 58 is assembled to each of two adjacent V-shaped form side walls 52. A casting space is defined by the V-shaped form side walls, the end form cap 58, and the casting space is then filled with a concrete mixture.

In one variation of the method, a pipe 18 is secured within the central hub 20 to a first protrusion attached to the base and a second projection attached to a top plate.

In another variation of the method, a seawall section is made by attaching one of the V-shaped walls to the base before placing the rebar cage on the base, and thereafter attaching the other V-shaped walls to the base to enclose the rebar cage.

The method may further comprise holding the spacers with an elongated member having at least one magnet at one end that magnetically retains one of the spacers between the V-shaped walls in alignment with the spacer attachment openings that are then retained by fasteners inserted in the spacers.

The method is completed by curing the concrete mixture to form the seawall section, disassembling the V-shaped walls from the seawall section and the base, and removing the spacers from the seawall section.

The embodiments described above are specific examples that do not describe all possible forms of the disclosure. The features of the illustrated embodiments may be combined to form further embodiments of the disclosed concepts. The words used in the specification are words of description rather than limitation.

What is claimed is:

1. A seawall section comprising:
   central hub having an axis extending in a longitudinal direction; and
   three circumferentially spaced walls extending radially from the central hub, each of the walls being made of cast concrete reinforced with a rebar cage, the rebar cage having a plurality of longitudinally spaced pairs of parallel rebars extending radially from the central hub to an end rebar link that extends perpendicularly between the parallel rebars, wherein each of the end rebar links are connected to radially outer ends of one of the pairs of parallel rebars, wherein the rebar cage includes a plurality of central rebar links that each extend perpendicularly between to two radially inner ends of one of the pairs of parallel rebars, wherein each pair of the parallel rebars, the end rebar link, and the central rebar link are connected in a shape of a rectangle; and
   a pipe disposed within a central opening defined by the central hub and extending in the longitudinal direction along the axis of the central hub, wherein the pipe is centered relative to the central rebar links and encompasses the axis of the central hub.

2. The seawall section of claim 1 wherein each of the walls of the rebar cage includes &an end longitudinal rebar connected to the end rebar link, and wherein a central longitudinal rebar is connected to the central rebar link.

3. The seawall section of claim 1 wherein each of the walls of the rebar cage includes an intermediate rebar link connected to the parallel rebars between and spaced from the central rebar link and the end rebar link.

4. The seawall of claim 3 further comprising:
   an intermediate longitudinal rebar is connected to the intermediate rebar link.

5. The seawall section of claim 1 wherein the parallel rebars are connected to each other, the central rebar links, and a hub rebar web encircling the axis of the central hub.

6. The seawall section of claim 1 wherein the walls define a plurality of spaced holes through the cast concrete, wherein each of the spaced holes is adapted to receive a fastener, wherein at least one of the holes in each wall is disposed radially inside the end rebar links and between the spaced parallel rebars.

7. The seawall section of claim 1 wherein at least three of the spaced pairs of the parallel rebars are longitudinally spaced from each other to reinforce the cast concrete at longitudinally spaced locations.

8. The seawall section of claim 1 further comprising:
   a first end wall attached to a first end of the central hub and a first end of the three circumferentially spaced walls, the first end wall extending radially outwardly from the central hub; and
   a second end wall attached to a second end of the central hub and a second end of the three circumferentially spaced walls, the second end wall extending radially outwardly from the central hub, wherein the first and second end walls define a plurality of holes that are adapted to receive fasteners that connect two adjacent sections together.

9. A seawall comprising:
   A plurality of seawall sections, each of the seawall sections including central hub having an axis extending in a longitudinal direction, and three circumferentially spaced walls extending radially from the central hub, each of the walls being made of cast concrete reinforced with a rebar cage having a plurality of longitudinally spaced pairs of parallel rebars extending radially from the central hub to an end rebar link that extends perpendicularly relative to the parallel rebars, wherein each of the end rebar links are connected to radially outer ends of one of the pairs of parallel rebars, and a pipe aligned with the axis and disposed within a central opening defined by the hub and extending in the longitudinal direction, wherein the walls define a plurality of spaced holes through the cast concrete for receiving a fastener, wherein at least one of the holes in each wall is disposed radially inside the end rebar links; and a plurality of elongated plates attached on opposite ends to two adjacent seawall sections with the fasteners that are received in the holes.

10. The seawall of claim 9 further comprising:
a cable inserted through the pipe of each of the seawall sections to hold the seawall sections together.

11. The seawall of claim 9 wherein the plurality of elongated plates are attached on opposite ends to two adjacent seawall sections, wherein threaded receptacles are disposed in the spaced holes defined by the three circumferentially spaced walls, and wherein a bolt is received in a threaded receptacle to attach the plates to each of the two adjacent seawall sections.

12. The seawall of claim 11 further comprising:
a gasket provided between adjacent seawall sections, wherein the gasket includes a hub section and wall-joining sections that form a seal between the two adjacent seawall section hubs and walls to prevent leakage between the two adjacent seawall sections.

\* \* \* \* \*